April 26, 1955  A. L. BOBRICK  2,707,119
SELF-ADJUSTING TURNBUCKLE
Filed Aug. 17, 1951
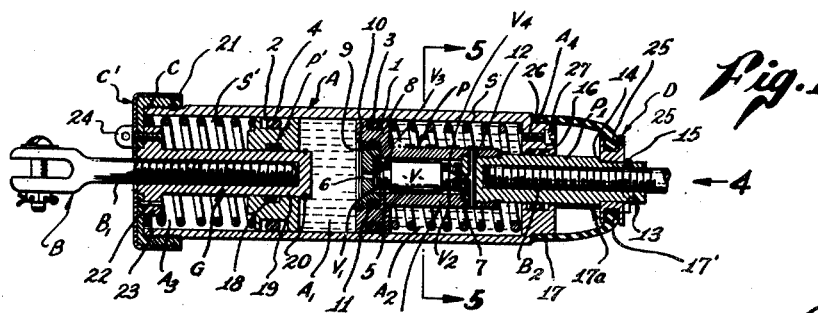
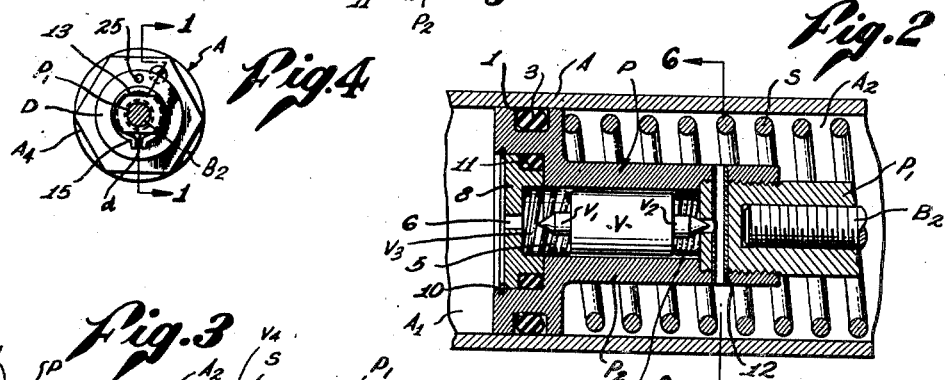
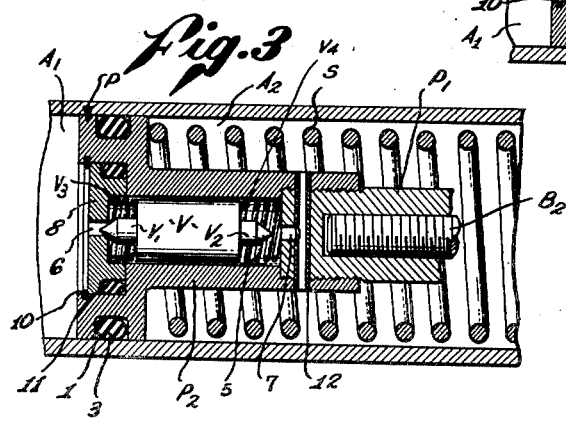
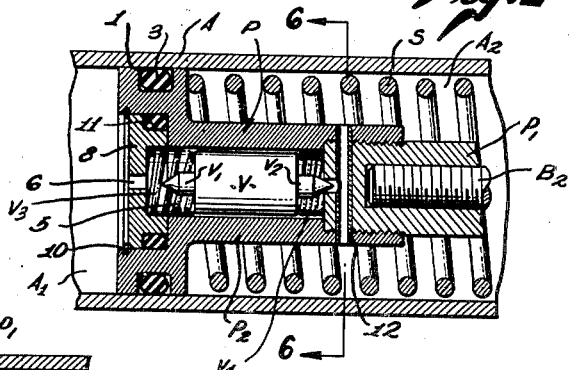
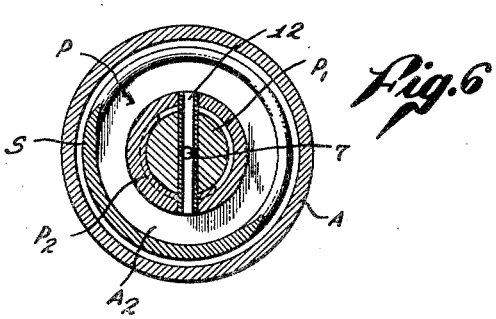
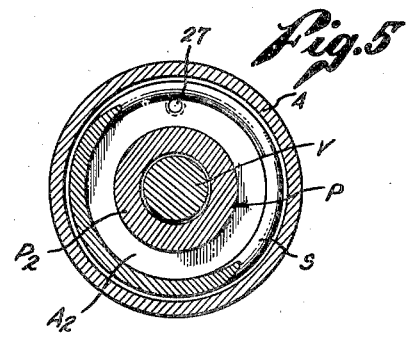
INVENTOR.
ARTHUR L. BOBRICK
BY
Attorney

United States Patent Office 2,707,119
Patented Apr. 26, 1955

2,707,119

SELF-ADJUSTING TURNBUCKLE

Arthur L. Bobrick, Pasadena, Calif., assignor to Bobrick Manufacturing Corporation, Los Angeles, Calif., a corporation of Delaware Application August 17, 1951, Serial No. 242,267

17 Claims. (Cl. 287—60)

This invention, in its broadest aspects contemplates the provision of a self-adjusting turnbuckle adapted to maintain an optimum tension on a cable or line, and includes a tubular barrel with a tensioner axially movable in one end of the barrel and a coaxial guide member fixed to the other end of the barrel, said tensioner and said guide member being internally and reversely threaded to receive correspondingly threaded stems of attaching devices which are in turn affixed to the ends of two sections of cable, together with compensating means in said barrel which compensates for expansion and contraction of fluid in the barrel due to variations in temperature, displacement of fluid occasioned by extension into and retraction from the barrel of the stem of a piston which is movable in the barrel in response to expansion and contratcion of a control cable, and said piston being spring loaded a normal rigging pressure is maintained in the barrel.

A specific object of this invention is to provide a turnbuckle unit having the aforesaid characteristics which additionally employs a fluid contained in the barrel, a main piston forming an element of the tensioner and a second piston axially adjustable on said guide member, said pistons being arranged to provide a main fluid pressure chamber therebetween of variable area and a second chamber behind said main piston, a valve chamber in said main chamber affording communication between said main chamber and said second chamber, and a valve in said valve chamber for regulating flow of a fluid between said chambers in response to the movement of said main piston, the movement of said second piston being also in response to that of the main piston and the tightening or slackening of the cable line.

Another object is to spring load the main and compensator pistons to a different extent—the main piston being loaded to an extent less than said compensator piston, so that said pistons will be urged toward each other to a predetermined extent and thereby vary the area and pressure in the main chamber therebetween to influence flow of a fluid between said main and second chambers in accordance with prevailing conditions in the cable line and thereby tend to maintain an optimum tension in the cable line.

This invention also partakes of the nature of a cable tension regulator with a control cable, as for instance, on an airplane or other mechanism, and initially adjusted to tension a control cable as under sea level conditions, for the rigging of an airplane so that under normal static condition of the airplane a cable operatively connecting a manually operable wheel or stick with a rudder, elevator or aileron, will be initially tensioned, to an optimum extent and will be automatically self-adjustable to maintain an optimum tension under varying conditions of flight, due to changing temperatures at different elevations and the consequent expansion or contraction of the cables, fixtures and bodies of the airplane and resultant stretch.

I am aware that various types of mechanical and fluid controlled tension regulators as well as conventional turnbuckles have been heretofore used, but fluid controlled tension regulators now known and used have failed for many reasons to completely satisfy users, while conventional turnbuckles lack self-adjusting features now deemed desirable for the aforesaid purposes.

It is therefore an object of this invention to provide a single unit combining the mechanical features of a conventional turnbuckle with the automatic and self-adjusting fluid control features of conventional cable tension regulators as now known and used.

It is well known that conventional turnbuckles include a barrel or body which is reversely threaded at its opposite ends for adjustable connection with adjacent ends of sections of a cable so that when the barrel or body is rotated in a given direction the tension of a cable is correspondingly increased or decreased.

Conventional fluid controlled tension regulators include a barrel or cylinder in which a piston is movable and is urged in one direction by a compression spring. Said piston is attached to one section of cable while its barrel or cylinder is attached to an adjacent end of a second section of cable. Between said piston and an end of said cylinder there is contained a quantity of fluid which is displaceable (usually through or around the piston under valve control) by movement of the piston in one or the other direction, so that when the cable is expanded and contracted beyond a normal or rigged setting of the piston, slack in the cable will be taken up or when said cable is stretched or expanded, the movement of the piston will ordinarily compensate for such changed conditions and assure a predetermined and necessary tension under varying conditions.

Neither of said tensioning media being entirely satisfactory alone in all cases and under radically extreme conditions, I have determined that by combining the desirable features of both, a satisfactory and dependable tensioning unit can be produced which will effect economy in its production and use and will eliminate certain difficulties of production, installation, assembly, rigging and maintenance not possible with currently used units.

Extensive experimentation and developments in the airplane industry, under both static and flight conditions, have shown that perfect operation of the controls requires the pre-established requisite tension of the cables connecting the operating elements with the operated elements under varying static and flying conditions in response to changes in temperature, altitude, maneuvers, take-offs, landings and immobility on the ground.

The airframes, being usually formed of aluminum or an aluminum alloy, have a greater coefficient of expansion than the stranded steel cables employed for operatively connecting the operating elements with the operated elements and satisfactory tensioning units when applied to the cables should, therefore, automatically compensate for resultant expansion and contraction of the cables and stretch in the cables in order that a predetermined tension in the control lines may be at all times maintained under changes in static and flying conditions. In multi-engined aircraft, which comprises the great majorty of commercial planes, conditions arise in which it is necessary for cable tension regulators to operate under conditions of long continued imbalance which can occur only rarely in single engined planes and in which cable tensioning devices of known types would lose much of their effectiveness since they are designed to lock until the imbalance is removed, which is satisfactory when the imbalance is caused by ordinary maneuvers lasting from a few seconds to a minute or so.

In large aircraft, however, faulty loading or rigging may cause an imbalance in the control cables which cannot be remedied until the next landing which may be many hours later. This condition of imbalance may and frequently does occur in multi-engined aircraft when one or more engines on one wing have to be cut out because of engine trouble.

Accordingly, it is an important object of my invention to provide a cable tensioning turnbuckle which cannot lock more than momentarily under the maximum pull to which it is subjected by maneuvering of the plane so that the device will continue to discharge its functions notwithstanding an indefinitely prolonged imbalance in the pull on the control cables.

It is a further important object of the invention to provide a cable tensioning turnbuckle unit in which the return of the piston from extended position to normal will take place in a predetermined time at various temperatures, thus enabling the device to function perfectly when the airplane is being mechanically flown by the auto-pilot and is sufficiently slow to prevent tension being built up in the control cables by quick reversal of the controls. Under all conditions, however, the cable tensioning device of my invention, when properly installed, will instantly though momentarily lock to afford a solid connection to transmit a pull on the control cables.

Another important object of my invention is to provide a cable tensioning turnbuckle which may be preloaded to a known value and assembled in the cable control system in a minimum of time, the cable system being brought to the predetermined rigging load by a very simple procedure thus greatly shortening the time necessary to accurately rig the airplane.

Various devices have been designed and tested in attempts to attain the aforementioned objects, many of which embodied a closed cylinder filled with a hydraulic fluid and enclosing a spring loaded piston connected to one section of a control cable while an end of the cylinder was connected to an adjacent section of the cable. Theoretically, the piston under the influence of its spring would tend to take up slack in the control line under all conditions occasioned by expansion in the control line and contraction of the line would effect movement of the piston in a reverse direction and a consequent compression of its spring.

However, in order that the piston might move in the cylinder, some type of valve means has been provided for effecting and regulating the transfer of fluid from one to the other chambers of the cylinder at opposite ends of the piston.

In such previous devices, because the hydraulic fluid is non-compressible and the pressure in the spaced cylinder chambers is not always equalized and other conditions, the piston would lock and therefore fail in its compensating functions until the pull locking the device was relieved. Hence, such devices have been found impracticable for use with multi-engined aircraft.

I have, however, through a long period of experimentation and actual use of my tensioning turnbuckles on airplanes, both when static and in flight at widely different temperatures and altitudes, ascertained that a unit constructed, rigged on an airplane and employed in the manner hereinafter disclosed and explained, overcomes the usually predominant defects of prior tension regulators, and it is an object of the present invention so to do.

In order to attain the aforesaid and other objects, I have given careful consideration to the following factors:

A double acting piston valve carried by the plunger for effecting and regulating the flow of fluid between chambers in the cylinder at opposite ends of the piston and so arranged in a chamber of the piston that under different conditions a maximum or a minimum effective area of the valve will be presented to the fluid from one cylinder chamber for automatically opening a port between said chamber and simultaneously closing the port to the other cylinder chamber, or, at times opening the ports to both cylinder chambers when pressure in said chambers is equalized by bleeding of fluid around the valve.

A spring loaded compensator constantly urged in the direction of the plunger and forming a yieldable abutment at one end of the cylinder which yields against the effort of its spring as the cylinder contracts due to a lowering of temperature, and thereby prevents an increase in pressure of the hydraulic fluid in the adjacent cylinder chamber which would tend to change the proper relationship of the plunger and its cylinder and in the consequent line tension.

The compensator is arranged also to extend toward the piston when the fluid and cylinder are at the same lowered temperature; it compensates for volumetric changes due to the movement of the piston in and out of the cylinder; it maintains the fluid constantly under pressure so as to maintain all sealing rings effectively tight; and the compensator loading spring being of greater power than the piston loading spring, traps the fluid in the adjacent cylinder chamber when tension on a cable is suddenly released, preventing rapid movement of the piston. In the absence of the compensator, if the piston were pulled outwardly of the cylinder, a vacuum would be created in the remotest chamber of the cylinder which would change the viscosity and characteristics of the fluid by withdrawal of desirable volatile constituents and thereby impair the usefulness of the fluid.

In general, while I have employed in my tensioning units some of the well known elements utilized in previously proposed devices, I have added other and new elements and have provided refinements of certain old features necessary to dependable operation of the turnbuckle units under varying conditions on the ground and in the air, and to achieve the discharge of functions not hitherto effected.

In order to accomplish the aforesaid general objects it is an important subsidiary object to provide a fluid containing sealed barrel or cylinder in which there is a main piston and a subsidiary or compensating piston disposed in axial alinement on opposite sides of a volume of fluid. Said main piston has a stem extending from an end of said barrel which is threaded to receive the stem of a clevis attached to an end of one section of cable, said main piston being urged toward said compensating piston by a main compression spring. Said main piston has a valve controlling flow of fluid to a second chamber at the rear side thereof. Said compensating piston is likewise urged toward said main piston by a compression spring of more power than said main spring and is movable on an axial guide fixed to the end of said cylinder and threaded reversely with respect to said main piston stem so that the stem of a clevis attached to an end of a second section may be adjustably secured thereto.

Hence rotation of the cylinder on the piston stem and guide will correspondingly tension or slacken the two connected cable sections. When the cables contract the main piston P will be moved correspondingly to the right as shown and fluid flows from the chamber at the rear of the main piston and through the main piston under valve control into the main chamber between said pistons.

When, however, the cables expand and tend to slacken, the spring behind the main piston will urge the main piston toward the compensator piston and will occasion flow of fluid from the main chamber at the forward end of the main piston to the second chamber behind the main piston.

Hence, a desirable control means for rendering the turnbuckle self-adjusting is combined with the turnbuckle and other minor but important features shown in the accompanying drawing and hereinafter described to accomplish the aforesaid objects.

I have shown a preferred form of turnbuckle unit embodying my improvements, in said drawing, in which:

Fig. 1 is a longitudinal section in a diametrical plane showing the elements in normal rigged position for installation;

Fig. 2 is an enlarged fragmentary section in the plane of Fig. 1 showing the piston valve in a position when a load over and above the rigged load is applied suddenly to the cable;

Fig. 3 is a view similar to Fig. 2 except that it shows the valve in an opposite position to that shown in Fig. 2 following the thrust of the piston in an opposite direction to that shown in Fig. 2;

Fig. 4 is an end view in the direction of arrow 4 of Fig. 1;

Fig. 5 is a sectional view on line 5—5 of Fig. 1; and

Fig. 6 is a sectional view on line 6—6 of Fig. 2.

Referring to Fig. 1 it will be noted that my improved unit includes a barrel A forming a cylinder in which a main piston P and a compensating piston P' are arranged in coaxial opposition for reciprocation. A main compression spring S is confined between the rear end $A_4$ of the barrel and the right or rear side of piston P, thereby tending to urge piston P forwardly (leftwardly) to a normal extent as at what may be termed "rigged" position. Similarly piston P' is urged inwardly (rightwardly) by a compression spring S' confined between piston P' and the forward end of the cylinder which is preferably a cap C. Thus there is provided in the barrel A a main fluid chamber $A_1$, a second fluid chamber $A_2$ rightwardly of piston P, and a similar chamber $A_3$ leftwardly of piston P'. Pistons P and P' have annular grooves 1 and 2 in which sealing rings 3 and 4, respectively, seat to prevent leakage of fluid around the pistons between chambers $A_1$ and $A_2$ and $A_3$.

Piston P has an internal chamber 5 in which a valve V is adjustably held for alternately opening and closing ports 6 and 7 at opposite extremities of chamber 5, as by means of needle elements $V_1$ and $V_2$, respectively, under the influence of compression springs $V_3$ and $V_4$ arranged at opposite ends of valve V in chamber 5. Said valve springs $V_3$ and $V_4$ serve to normally hold valve V in normal or neutral position in chamber 5 with respect to ports 6 and 7 but yieldably so in opposite directions to permit seating of valve portions $V_1$ and $V_2$ over ports 6 and 7 as piston P is moved in the barrel. Preferably the port 6 is formed in a disc 8 which is held in a recess 9 of disc 8 as by means of a retaining ring 10. Leakage around disc 8 is prevented by a sealing ring 11. Port 7 is formed in the inner end of piston stem $P_1$ which is threadedly secured to a rearwardly extended tubular section $P_2$ of piston P. Section $P_2$ and stem $P_1$ are diametrically bored at 12 to provide a passage in communication with port 7 so as to at times effect communication between valve chamber 5 and barrel chamber $A_2$.

Piston stem $P_1$ has a reduced outer end portion 13 on which an annularly grooved member D is nonrotatably held between a shoulder 14 and a locking ring 15. The purpose of member D is two fold: it is adapted to receive a bead of a boot 17 which is extended forwardly therefrom over the rear end $A_4$ of the barrel A, for covering the exposed piston stem and guarding against fouling any part of an airplane which might otherwise contact the member D or stem $B_1$. The portion of stem $P_1$ embraced by member D and the bore of member D may have one or more flat mating facets $d$ for holding member D against rotation.

End $A_4$ bears a sealing ring 16 engaging stem $P_1$ to prevent leakage from chamber $A_2$ around said stem. When rigging the unit for operation a gauge $17a$ of proper length is inserted between the forward side of member D and end $A_4$ so as to properly position the piston P. The gauge or spacer $17a$ is of such length as to retain piston P in a position whereat its spring S will apply a definite predetermined force to said piston P, preparatory to shipment of a turnbuckle unit from a factory to a point of installation on an airplane for use. When the turnbuckle barrel is rotated in a given direction, the cable sections are tightened to an extent where the cable tension overcomes or exceeds the power of the main spring S, the piston P will move slightly to the right, as shown, and the spacer $17a$ will drop from its position shown in Fig. 1 and the cables will then be rigged to a predetermined tension.

Each unit is completely filled with fluid and rigged at the factory and spacer $17a$ is held in position by power of spring S to lock the piston stem extension $P_1$ so that the piston stem extension $P_1$ will not turn with reference to barrel A when barrel A is rotated to adjust the unit. When, however, barrel A is rotated and the turnbuckle is adjusted the movement of piston P rightwardly will release friction on spacer $17a$ and allow it to drop off of extension $P_1$. As it is never necessary to again adjust the turnbuckle after installation for use it is of no consequence whether the piston stem extension $P_1$ turns with reference to barrel A or not. Thus, the leftward or inward thrust of piston P is limited from a normal, static or rigged position to a maximum.

Piston P' bears a sealing ring 18 which embraces a stem 19 of guide G and prevents leakage of fluid from chamber $A_1$ into chamber $A_3$. A retainer ring 20 on the inner end portion of guide stem 19 limits the movement of piston P' in the direction of piston P.

In adapting the instant unit to serve as a turnbuckle under fluid control it has been found necessary to so arrange the compensating portion of the barrel with a guide for the piston P' which affords no opportunity for leakage of fluid from chamber $A_1$ around the guide. Hence, I provide the cap C with a locking ring 21 which although cap C is threaded onto the barrel A, locks the cap against unintentional removal by inserting an end of ring 21 in a hole in barrel A as shown in Fig. 1, while cap C is secured to a flange 23 of guide G as by means of rivets 22.

Thus, cap C being locked to barrel A and being fixed to guide G, said guide will rotate with the barrel when the turnbuckle is rotatably adjusted on stem $B_1$, but said guide and cap can not rotate independently of the other.

Main spring S is of sufficient tension to hold a temporary spacer $17a$ as a substitute for said gauge in frictional engagement at opposite ends with the end $A_4$ of the barrel and the adjacent side of member D so that when barrel A is rotated by applying a wrench to portion $A_4$, the piston stem $P_1$ will be simultaneously rotated to the same extent as the barrel. Hence, rotation of the barrel will correspondingly tension or slacken the cable sections by either extending or retracting the clevis stems $B_1$ and $B_2$ in the guide G and piston stem $P_1$.

The safety cap C' fits snugly on cap C and serves to retain the locking ring 21 in position. After cap C' is applied to cap C an eye screw 24 is extended through the wall of cap C' and into cap C, thereby serving to retain cap C' in position on cap C. It is customary in installing tension regulators on airplanes to wire the unit to the cable sections in some manner to prevent their dislodgment. Such wiring devices usually require the welding of attaching members to the cap or barrel and frequently occasion engineering difficulties and employment of more or less crude and makeshift media. I have provided means on the unit for such purpose of which the eye screw 24 on cap C is one device and the member D with a hole 25 therein is another device, both of which devices are arranged with their eyes or holes adapted to receive a strand of wire which is also affixed to the clevises B and B', the latter not shown, or to the cable sections, for holding the unit against rotation and accidental removal.

Valve V is of such diameter as to permit flow of fluid between the valve and the surrounding wall of its chamber 5 and said valve is of such length that it may move longitudinally in chamber 5 from a neutral position where it is normally held by its springs $V_3$ and $V_4$ with its portions $V_1$ and $V_2$ so disposed as to open both ports 6 and 7 to said chamber 5 or to open one and close the other of said ports under fluid pressure to permit flow of fluid through piston P and between chambers $A_1$ and $A_2$ as piston P moves in one or another direction in barrel A in accordance with tensioning or slackening of the cable sections due to any cause.

A vent 26 is provided as in end $A_4$ of the barrel A for the purpose of expelling air from the barrel during the assembling of a unit and also for filling the barrel with a suitable fluid. Said vent is closed normally as by means of a screw plug 27 extended through end $A_4$, for hermetically sealing the unit.

Preferably the barrel A is made of aluminum and of minimum weight and caps C and C' are also of aluminum. The safety cap C' is important because it affords a device of minimum weight, it covers the locking wire which positively locks the cap C to the barrel A, and renders the unit tamper proof when installed on an airplane.

When the unit is assembled the temporary gauge $17a$ is placed between the end $A_4$ of barrel A and member D thereby holding the piston P in normal initial position against the tension of main spring S. Chambers $A_1$ and $A_2$ are filled at the factory with a suitable fluid through vent 26. The unit is installed between two sections of cable and the clevises B and B' are carefully attached to the cable sections and to guide G and piston stem $P_1$, respectively. Thus, barrel A is rotated in a clockwise direction by a wrench applied to end $A_4$ of the barrel, thereby screwing the stems $B_1$ and $B_2$ into guide G and stem $P_1$ to an equal extent until the tension on the cable sections will balance the force of spring S applied to piston P. At such time the tension of the cables will retract piston P slightly (to the right as in Fig. 1) but sufficiently to release the gauge $17a$. Such initial movement of said piston effects a slight displacement of fluid from chamber $A_2$ through the valve chamber 5 and into chamber $A_1$ and the rigging of the airplane is complete.

The compensating piston P' is normally urged forward by its spring S' to a maximum extent and in its movement on its guide G leakage is prevented from chamber $A_1$ to the chamber rearwardly of piston P' by reason of the sealing rings 4 and 18. Thus, the barrel can move over guide G and piston P' in response to the power of spring S' and reversely by increase of pressure in chamber $A_1$ due to the inward movement of piston P or the reverse movement of piston P which occasions flow of fluid from chamber $A_2$ to chamber $A_1$.

It may be noted that spring S' is of more power than spring S. It may be understood at this point the relative power of springs S and S' is not relied upon for operation of the unit for the reason that piston areas are also factors which require precision of engineering calculations to establish exactitude and dependability of continued use under all foreseeable and possible conditions of use. Hence, when piston P is moved inwardly under power of its spring S under normal conditions, the fluid pressure applied to piston P′ in chamber $A_1$ will occasion retraction of piston P′ to an extent measurable by the displacement of fluid in chamber $A_2$ by piston stem $P_1$, i. e. the more of member $P_1$ in chamber $A_2$, the more fluid will be displaced. However, when the cables expand, piston P may move inwardly (leftwardly) to a greater extent than possible by the force of spring S and to an extent corresponding to the lengthening of the cable sections, and piston P′ will move accordingly against the tension of spring S′. Thus the compensating piston P′ provides a spring loaded movable abutment at one side of chamber $A_1$ instead of a fixed abutment which would be incapable of affording necessary flexibility of the unit and unadaptability to maintain an optimum of tension in the cables under varying operating and atmospheric conditions.

It will of course be understood that there are many factors to be considered, evaluated and overcome, especially in the operation of airplanes which, if overlooked, adversely affect the control and flying of airplanes. Said factors include: variations in temperature on the ground or during flight, windage, natural expansion of cables, supports, fixtures, etc. due to changes in temperature, stretching of the tensioned cables, sudden or continued manual operation of the controls, warpage, thermal variances, and sundry other frequent or infrequent conditions.

It is apparent that when the regulator unit of my design is rigged at ground level, regardless of prevailing weather conditions, the turnbuckle unit will automatically self adjust its parts during an ensuing flight to and at any elevation and under any and all foreseeable conditions, as will appear from the following detailed description of the operational features and coordination of its parts.

Let it be assumed that Fig. 1 shows a unit rigged in an airplane for use. After a take-off as an airplane ascends to higher levels the temperature usually decreases gradually, thereby causing a corresponding contraction of the control cables and a consequent rightward movement of the piston P against its spring S and permitting a flow of fluid from chambers $A_2$ and 5 around valve V and into chamber $A_1$ through port 6. At such time pressure in chamber $A_1$ is relieved, and if not previously moved the piston P′ may extend under the power of spring S′ further into chamber $A_1$ toward piston P until pressure in chambers $A_2$ and 5 is sufficient to close valve V on port 6, whereupon the tension in the cables applied to piston P will balance the pressure in chamber $A_1$ and the parts of the unit will remain in their adjusted positions until a subsequent change in conditions effects a change in their relative positions.

The expansion of the air frame or contraction of the cables or any other condition of flight operating to like effect will cause the piston P to move to the right away from piston P′ and against prevailing pressure in chamber $A_2$, or will tend to do so, and pressure in chamber $A_2$ will cause fluid to flow around valve V into chamber $A_1$. In the meantime the attempt of piston P so to move may have increased pressure in chamber $A_2$ to an extent necessary to overpower spring S and at such time the optimum balance of the unit will have been met and the then prevailing conditions in the unit will be maintained.

Deflection of the airframe when air borne might cause both pistons to lock and stay locked because of the altered tension in the cables. In other words, the pistons P and P′ might be locked in positions where the cable was subjected to undue tension.

To correct these unfavorable conditions, it is necessary to provide a valve construction which will insure against the cable tensioning unit staying locked in either direction at loads less than a predetermined proportion of the maximum loads that could be applied in intentional maneuvers and that will therefore provide the same tension throughout the cable system in neutral position, and also that the pistons P and P′ will resume their initial positions and not hold any additional tension in the cables.

As an example of a tensioning device constructed according to my invention and exhaustively tested on a large four-engined airplane in which a twenty-pound pull on the control cables over the rigging load was sufficient to effect a change in the direction of flight of the plane, the following details are given. The spring compressed by the piston has a spring constant of 40 lbs. per inch deflection and 1½ in. maximum deflection. The cable tensioner is rigged with an initial extension of the plunger stem of ¾″ and when so rigged maintains a positive load on the control cables at temperatures between minus 65° F. and plus 160° F., the rate of movement being 1/20 inch per minute to compensate properly for expansion and contraction of the airframe at maximum rate of change. The valves in the plungers close at between 15 and 20 lbs. pull over the rigging load but will not lock at loads of 1200 lbs. or under which is the maximum load which can be applied by both pilot and co-pilot exerting maximum effort.

Ordinary maneuvers cause no movement of the pistons in the cable tensioners since the minimum cycling time of the valve in the plungers is between 4 and 5 seconds, but becomes longer as the load increases. Cycling of the valve continues up to the maximum limit stated, and if the load increases beyond this point, the cable tensioner carrying the valve will lock, but as soon as the load is reduced below the maximum, the valve will recommence its cycling movement.

It will be apparent that the compensator piston P′ serves to maintain fluid pressure in chamber $A_1$ regardless of the relative positions of pistons P and P′ due to expansion or contraction of the fluid and variations occasioned by extension of piston stem $P_1$ in chamber $A_2$ and the corresponding variation of the capacity of chamber $A_2$, movement of piston P′ toward piston P being responsive to its spring S′. Compensator spring S′ has greater power than spring S because, upon sudden slackening of the cables the main spring S tends to force the piston P inwardly and to thereby seat portion $V_2$ of valve V over port 7. Such an action would prevent fluid from chamber $A_1$ from displacement to chamber $A_2$ and spring S′ would exert sufficient force on piston P′ to resist to the extent of its power on over movement of piston P under such conditions, and fluid will be trapped in chamber $A_1$ between the two pistons and piston P will be held in the position to which it was moved when the cables slackened. Valve V is normally held in open or neutral position with respect to the ports 6 and 7 by means of its balanced loading springs $V_3$ and $V_4$, thus regulating flow of fluid between chambers $A_1$ and $A_2$, through ports 6 and 7 and around the body of the valve, in response to the reciprocation of said valve in its chamber 5.

It may be emphasized that pistons P and P′ are moved inwardly in barrel A, i. e., one toward the other, only by power of their springs S and S′, respectively, and piston P is moved away from piston P′ only by expansion of the airframe or contraction of the control cables against power of spring S. Thus, tension of the cables is maintained within the limits of spring S.

Normally fluid may freely flow between chambers $A_1$ and $A_2$ through chamber 5 around valve V when the piston P is moving slowly in either direction in response to expansion or contraction of the cables or the airframe. But, said valve V only seats over ports 6 or 7 in response to a sudden pull on load over and above the normal or rigged load of the unit.

It is apparent that without some means in barrel A for trapping the fluid at one or the other end of piston P, the unit disclosed could not function as a turnbuckle because a turnbuckle requires a positive and unyielding connection between the cable sections it serves to adjustably connect. In this instance the trapped fluid (liquid) being noncompressible affords a satisfactory and effective connecting means. Hence, by taking care of the expansion and contraction factors, as aforesaid, a self-adjusting turnbuckle is provided.

When a sudden load is applied to the unit it is necessary that the unit be positively locked in adjusted condition so that when any load above the rigged load is applied to either of the connected cable sections it will be instantaneously applied to the other cable section and when such a condition occurs, either of the valve portions $V_1$ or $V_2$ would seat over ports 6 or 7, as the case may be, and piston P would be prevented from moving in one or the other direction, respectively.

Previous developments in cable tension regulators have included primarily means for creating and maintaining a requisite tension in the cables under varying conditions of use and have failed to recognize or compensate for expansion and contraction of the airframe on which the control cables are mounted.

In the provision of my instant unit I have sought to provide adequate means for taking care of expansion and contraction factors of the airframe as well as the control cables, in due recognition of the greater areas of the airframe which are subjected to great differences of temperature both on the ground and when in flight. And, by combining a hydraulic cable tension maintaining means with well known features and characteristics of a mechanical turnbuckle, I have provided an automatic self-adjusting hydraulic turnbuckle which is simple, effective, durable and economical, and moreover is free from usual defects of tension regulators.

I claim:

1. A self-adjusting turnbuckle comprising: a barrel, closures nonrotatably secured on opposite ends of said barrel, an axially disposed internally threaded guide fixedly secured on each of said closures, a spring loaded first piston coaxial with and fixed to a first of said guides reversely threaded devices axially adjustable in said guides arranged for connection at their outer extremities with adjacent ends of separate sections of a cable or the like, said first piston serving to separate two major chambers in said barrel, and automatically operative means in said barrel including a spring compressed between one of said closures and said first piston for adjusting the relative positions of the barrel and said first piston to an extent which will establish an optimum tension on the cable sections, a spring loaded second piston in said barrel axially movable on a second of said guides for at times maintaining a fluid trapped between said pistons, and means for preventing relative rotation between said first piston and said barrel so that rotation of said barrel will cause the concomitant rotation of said first piston and its associated guide for tightening said cable sections.

2. A self-adjusting turnbuckle as set forth in claim 1 including: a double acting valve borne in a chamber of said first piston, said valve chamber having ports for at times affording communication through said valve chamber and between said major chambers, said major chambers adapted to receive a fluid displaceable by said first piston when the first piston is moved in opposite directions for transferring fluid from one to the other of said major chambers in response to the movement of said first piston, said valve at times affording communication between and at other times closing communication between said major chambers for trapping fluid in one of said major chambers, whereby at a predetermined time as determined by the position of the valve and by force applied to opposite sides of the valve and other factors the first piston will be free to move forwardly or backwardly.

3. A self-adjusting turnbuckle as set forth in claim 1 including: a double acting valve borne in a chamber of said first piston, said valve chamber having ports for at times affording communication through said valve chamber and between said major chambers, said major chambers adapted to receive a fluid displaceable by said first piston when the first piston is moved in opposite directions for transferring fluid from one to the other of said major chambers in response to the movement of said first piston, said valve at times affording communication between and at other times closing communication between said major chambers for trapping fluid in one of said major chambers, whereby at a predetermined time as determined by the position of the valve and by force applied to opposite sides of the valve and other factors the first piston will be free to move forwardly or backwardly, said second piston opposing and being spring urged toward the first piston, for at times holding fluid between the two pistons, subject to displacement only through said valve chamber for transfer to a major chamber.

4. A self-adjusting turnbuckle as set forth in claim 1 including: a double acting valve borne in a chamber of said first piston, said valve chamber having ports for at times affording communication through said valve chamber and between said major chambers, said major chambers adapted to receive a fluid displaceable by said first piston when the first piston is moved in opposite directions for transferring fluid from one to the other of said major chambers in response to the movement of said first piston, said valve at times affording communication between and at other times closing communication between said major chambers for trapping fluid in one of said major chambers, whereby at a predetermined time as determined by the position of the valve and by force applied to opposite sides of the valve and other factors the first piston will be free to move forwardly or backwardly, said second piston opposing and being spring urged toward the first piston, whereby fluid pressure between the two pistons may be at times maintained by reason of said valve when the power of said spring is applied to the first piston.

5. A self-adjusting turnbuckle as set forth in claim 1 including: a double acting valve borne in a chamber of said first piston, said valve chamber having ports for at times affording communication through said valve chamber and between major chambers provided forwardly and rearwardly of said first piston, said major chambers adapted to receive a fluid displaceable by said first piston when the first piston is moved in opposite directions, for transferring fluid from one to the other of said major chambers in response to the movement of said first piston, said second piston opposing and being spring urged toward the first piston, whereby fluid under pressure created between the two pistons is maintained in the chamber, and means for balancing said valve against closing movement in either direction to allow flow of fluid between said major chambers except in response to a sudden pull on the cables.

6. A self-adjusting turnbuckle as set forth in claim 1 including: a double acting valve borne in a chamber of said first piston, said valve chamber having ports for at times affording communication through said valve chamber and between major chambers provided forwardly and rearwardly of said first piston, said major chambers adapted to receive a fluid displaceable by said piston when the piston is moved in opposite directions for transferring fluid from one to the other of said major chambers in response to the movement of said first piston, said second piston opposing said first mentioned piston and being spring urged toward the first piston, to at times maintain fluid under pressure in the chamber between the two pistons, the major chamber between said pistons and the major chamber behind the first piston being normally in restricted communication with said valve chamber around said valve when the first piston is moved by expansion and contraction of an airframe and cables, but upon creation of pressure in either of said major chambers in excess of pressure in the other major chamber as by a sudden pull on the cables communication between the major chambers is closed by the opening of one and the closing of the other of said ports through automatic operation of said valve.

7. A self-adjusting turnbuckle as set forth in claim 1 including: a double acting valve borne in a chamber of said first piston, said valve chamber having ports for at times affording communication through said valve chamber and between major chambers provided forwardly and rearwardly of said first piston, said major chambers adapted to receive a fluid displaceable by said piston when the piston is moved in opposite directions for transferring fluid from one to the other of said major chambers in response to the movement of said first piston, said second piston opposing said first mentioned piston and being spring urged toward the first piston, to at times maintain fluid under pressure in the chamber between the two pistons, the major chamber between said pistons and the major chamber behind the first piston being normally in restricted communication with said valve chamber around said valve when the first piston is moved by expansion and contraction of an airframe and cables, but upon creation of pressure in either of said major chambers in excess of pressure in the other major chamber as by a sudden pull on the cables communication between the major chambers is closed by the opening of one and the closing of the other of said ports through automatic operation of said valve, said valve being spring loaded on opposite sides to normally unseat the valve from both ports but responsive to sudden expansive and contractive forces applied to the airframes and cables for closing one or the other of said ports and thereby trap fluid in a corresponding major chamber.

8. A self-adjusting turnbuckle comprising: a barrel, nonrotatable closures on opposite ends of said barrel, an axially disposed internally threaded guide nonrotatable on each of said closures, a first piston coaxial with and axially adjustable on one of said guides, reversely threaded devices axially adjustable in said guides arranged for connection at their outer extremities with adjacent ends of adjacent sections of a cable or the like, automatically operative means in said barrel including a spring compressed between a portion of said barrel and said first piston for adjusting the relative positions of the barrel and first piston to an extent which will establish an optimum tension on the cable sections, and compensating means confined in said barrel including a spring loaded second piston yieldable away from the first piston in response to the inward thrust of the first piston upon expansion of an airframe and movable toward the first piston under power of its spring in response to contraction of the airframe and cable sections, so as to maintain an optimum tension in the cable line under variable tendencies to increase or decrease the tension thereof, said first piston having a stop member connected thereto and disposed externally of and spaced from an end of said barrel, and a spacer between the first piston and said stop member for limiting the inward thrust of the first piston.

9. A self-adjusting turnbuckle as set forth in claim 1 including: a double acting valve borne in a chamber of said piston, said valve chamber having ports for at times affording communication through said valve chamber and between major chambers forwardly and rearwardly of said piston, said major chambers adapted to receive a fluid displaceable by said piston when the piston is moved in opposite directions for transferring fluid from one to the other of said major chambers in response to the movement of said first piston, and means connected to said first piston externally of said barrel for limiting the inward thrust of the first piston.

10. A self-adjusting turnbuckle comprising: a barrel, nonrotatable closures on opposite ends of said barrel, an axially disposed internally threaded guide nonrotatable on one of said closures, a reversely threaded first piston coaxial with said guide and axially adjustable on said other end closure, reversely threaded devices axially adjustable in said guide and in said first piston and arranged for connection at their outer extremities with adjacent ends of adjacent sections of a cable or the like, and automatically operative means in said barrel including a dual valve borne by said first piston, a spring compressed between an end of said barrel and said first piston for urging the first piston inwardly in the barrel, said barrel and said first piston being relatively adjustable to an extent which will tighten and establish an optimum tension on the cable sections, and a compensating second piston coaxial with the first piston between which and said first piston a chamber is provided for at times trapping fluid against displacement, said first piston being movable in response to expansion and contraction of an airframe and cable line without completely preventing displacement of fluid from the chamber between said pistons but preventing displacement of fluid from said chamber upon a sudden pull on the first piston, said first piston bearing a stop member externally of and spaced from an end of said barrel, a spacer on the first piston and said stop member for limiting the inward thrust of the first piston, and a boot having an end held on said stop member and overlying the adjacent end of said barrel, for preventing fouling of the first piston, said compensating piston being spring urged toward the first piston.

11. A self-adjusting turnbuckle comprising: axially adjustable elements having reversely threaded stems to receive fixtures attached to opposite ends of cable sections, and valve controlled fluid pressure means for applying forces to said elements in response to expansion and contraction of the cable line arising from variable conditions of use, said fluid pressure means including: a closed cylinder adapted to hold a fluid under pressure, a pair of coaxial pistons independently slidable in said cylinder under variable pressure and spring loaded to urge the pistons toward each other against prevailing pressure therebetween, there being a fluid chamber behind at least one of said pistons, and a valve borne by one of said pistons for controlling flow of fluid from between said pistons to behind the valve bearing piston and vice versa as one of the pistons is moved toward and away from the other piston.

12. A self-adjusting turnbuckle comprising: axially adjustable elements reversely threaded to receive fixtures attached to opposite ends of cable sections, and valve controlled fluid pressure means for applying forces to said elements in response to expansion and contraction of the cable line arising from variable conditions of use, said fluid pressure means including: a closed cylinder adapted to hold a fluid under pressure, a pair of coaxial pistons independently slidable in said cylinder under variable pressure and spring loaded to urge the pistons toward each other against prevailing pressure therebetween, there being a fluid chamber behind at least one of said pistons, and a valve borne by one of said pistons for controlling flow of fluid from between said pistons to behind the valve bearing piston and vice versa as one of the pistons is moved toward and away from the other piston, one of said pistons having a stem slidable in one end of said cylinder, and means on said stem for limiting the inward movement of the associated piston to an extent required to establish an optimum rigged tension on the cable line.

13. A self-adjusting turnbuckle comprising: a barrel containing a fluid, an axially disposed internally threaded tubular guide axially secured to said barrel against rotation, a first piston having a tubular stem slidable through an end of said barrel, a second piston slidable in the barrel and on said guide, said stem and said guide being reversely threaded, means for screw connecting said stem and said guide with ends of cable sections of a line, means for preventing rotation of said tubular stem with respect to said barrel so that when said barrel is rotated said tubular stem will be rotated thereby to cause said screw connecting means to move axially in said stem to vary the tension of said cable sections, and automatically operative valve means in said barrel for regulating flow of a fluid between chambers on opposite sides of the first piston for applying forces to and for moving said pistons in response to expansion, stretching and contraction of an airframe and cable line under varying conditions of use.

14. A self-adjusting turnbuckle comprising: a barrel, an axially disposed internally threaded tubular guide axially secured to said barrel against rotation, a first piston having a tubular stem slidable through an end of said barrel, a second piston slidable in the barrel and on said guide, said stem and said guide being reversely threaded, means for screw connecting said stem and said guide with ends of cable sections of a line, means for preventing rotation of said tubular stem with respect to said barrel so that when said barrel is rotated said tubular stem will be rotated thereby to cause said screw connecting means to move axially in said stem to vary the tension of said cable sections, and automatically operative dual valve means borne by said first piston for regulating the displacement of fluid between chambers on opposite sides of and through said first piston by application of forces to said pistons in response to expansion, stretching and contraction of the cable line under varying conditions of use, said pistons being spring loaded to urge them toward each other.

15. A self-adjusting turnbuckle comprising: a barrel, an axially disposed internally threaded tubular guide axially secured to said barrel against rotation, a first piston having a tubular stem slidable through an end of said barrel, a second piston slidable in the barrel and on said guide, said stem and said guide being reversely threaded, means for screw connecting said stem and said guide with ends of cable sections of a line, means for preventing rotation of said tubular stem with respect to said barrel so that when said barrel is rotated said tubular stem will be rotated thereby to cause said screw connecting means to move axially in said stem to vary the tension of said cable sections, automatically operative means in said barrel for applying forces to and for moving said pistons in response to expansion, stretching and contraction of the cable line under varying conditions of use, said automatically operative means including springs behind and urging said pistons toward each other, a fluid displaceable in said barrel between a main chamber between said pistons and a second chamber rearwardly of said first piston, and a dual valve borne by and in a chamber of said first piston for permitting limited flow of said fluid between said chambers, in response to the movement of the main piston occasioned by expansion and contraction of an airframe and cable line but allowing free flow of fluid in response to sudden pulls on the first piston.

16. A self-adjusting turnbuckle comprising: a cylinder having a fixed closure at one end and a removable closure at its other end arranged to contain a fluid, a piston slidable in said cylinder and having a stem extensible through said fixed closure, attaching members arranged for connection with sections of a cable line and threadedly connected with said cylinder and said piston stem, respectively, means for preventing relative rotation between said cylinder and said piston stem whereby rotation of said cylinder in opposite directions will tighten and slacken said cable line due to movement of said attaching member in said stem, said piston having a chamber therein with ports for at times affording communication with fluid chambers in said cylinder located ahead of and behind said piston, and a dual valve in said valve chamber normally in neutral position between and for opening said ports to flow of fluid through said valve chamber and around said valve in response to the slow movement of said piston due to expansion and contraction of the cable line but arranged to close one of said ports against displacement of fluid through the valve chamber in the event of a sudden application of force to said piston in either direction and thereby to lock the piston in its then position and thus maintain a normal tension in the cable line.

17. A self-adjusting turnbuckle comprising: a cylinder having a fixed closure at one end and a removable closure at its other end and arranged to contain a fluid, a piston slidable in said cylinder and having a stem extensible through said fixed closure, attaching members arranged for connection with sections of a cable line and threadedly connected with said cylinder and said piston stem, respectively, means for preventing relative rotation between said cylinder and said piston stem whereby rotation of said cylinder in opposite directions will correspondingly tighten and slacken said cable line due to movement of said attaching member in said stem, said piston having a chamber therein with ports for at times affording communication with fluid chambers in said cylinder located ahead of and behind said piston, and a dual valve in said valve chamber normally in neutral position between and for opening said ports to flow of fluid through said valve chamber and around said valve in response to the slow movement of said piston due to expansion and contraction of the cable line but arranged to close one of said ports against displacement of fluid through the valve chamber in the event of a sudden application of force to said piston in either direction and thereby to lock the piston in its then position and thus maintain a normal tension in the cable line, and means for initially limiting the inward thrust of said piston in rigged position to maintain a predetermined tension when connected with a cable line, said removable closure having an axial guide extended into said cylinder, a second piston slidable on said guide, and compression springs urging said pistons inwardly toward each other to a predetermined extent, the spring behind said second piston having greater power than the spring of said first mentioned piston.

References Cited in the file of this patent

UNITED STATES PATENTS

| | | |
|---|---|---|
| 1,151,600 | Lacoin | Aug. 31, 1915 |
| 1,984,026 | Little | Dec. 11, 1934 |
| 2,323,352 | Pitts | July 6, 1943 |
| 2,331,498 | Otto | Oct. 12, 1943 |
| 2,405,377 | Sturgess et al. | Aug. 6, 1946 |
| 2,424,198 | Tauscher | July 15, 1947 |
| 2,479,096 | Bratz | Aug. 16, 1949 |
| 2,533,894 | Rodell | Dec. 12, 1950 |

FOREIGN PATENTS

| | | |
|---|---|---|
| 907,978 | France | Aug. 6, 1945 |